(12) United States Patent
Takahashi

(10) Patent No.: US 9,781,353 B2
(45) Date of Patent: Oct. 3, 2017

(54) IMAGE PROCESSING APPARATUS, ELECTRONIC APPARATUS, AND IMAGE PROCESSING METHOD

(71) Applicant: Yuuki Takahashi, Kanagawa (JP)

(72) Inventor: Yuuki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/943,075

(22) Filed: Nov. 17, 2015

(65) Prior Publication Data

US 2016/0156852 A1 Jun. 2, 2016

(30) Foreign Application Priority Data

Nov. 28, 2014 (JP) .................................. 2014-241312

(51) Int. Cl.
*H04N 5/225* (2006.01)
*H04N 5/262* (2006.01)
*H04N 5/357* (2011.01)
*H04N 5/77* (2006.01)

(52) U.S. Cl.
CPC ........... *H04N 5/2621* (2013.01); *H04N 5/357* (2013.01); *H04N 5/77* (2013.01); *H04N 5/772* (2013.01)

(58) Field of Classification Search
CPC .................................................. H04N 5/3572
See application file for complete search history.

(56) References Cited

U.S. PATENT DOCUMENTS

| 5,675,380 A * | 10/1997 | Florent | H04N 5/217 348/247 |
| 2004/0155970 A1* | 8/2004 | Johannesson | H04N 5/3572 348/231.6 |
| 2005/0053307 A1* | 3/2005 | Nose | G06T 3/0018 382/275 |
| 2005/0174437 A1* | 8/2005 | Iga | H04N 5/3572 348/222.1 |
| 2009/0015694 A1* | 1/2009 | Saito | G02B 15/173 348/240.99 |
| 2010/0321538 A1* | 12/2010 | Nakazono | H04N 5/3572 348/241 |
| 2011/0122298 A1* | 5/2011 | Takahashi | H04N 5/3572 348/241 |

FOREIGN PATENT DOCUMENTS

| JP | 61-098479 | 5/1986 |
| JP | 2010-244113 | 10/2010 |

* cited by examiner

*Primary Examiner* — Twyler Haskins
*Assistant Examiner* — Dwight C Tejano
(74) *Attorney, Agent, or Firm* — Harness, Dickey & Pierce P.L.C.

(57) ABSTRACT

An image processing apparatus includes a transformation circuit that performs a predetermined transformation process based on a reference area referred from an input image stored in a first memory corresponding to each divided area that divides an output image to be generated into multiple areas and a second memory that stores a transmission area including a logical OR area of the multiple reference areas. The transformation circuit transfers the transmission area from the first memory to the second memory and performs the predetermined transformation process based on the reference area included in the transmission area transferred to the second memory.

13 Claims, 8 Drawing Sheets

FIG. 5
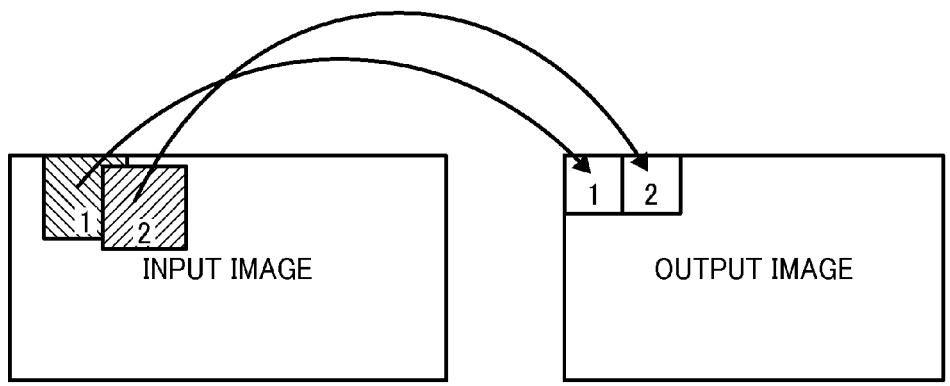
FIG. 6
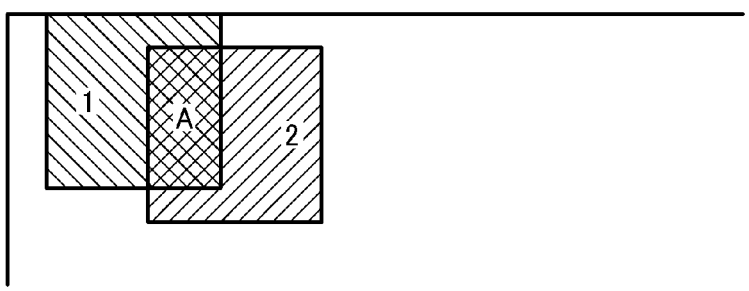
FIG. 7A     FIG. 7B     FIG. 7C
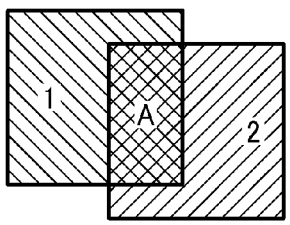 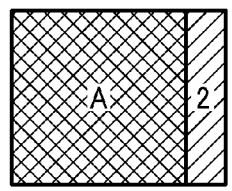 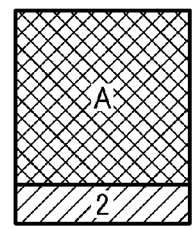
  
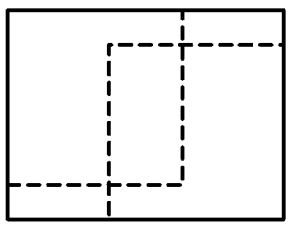 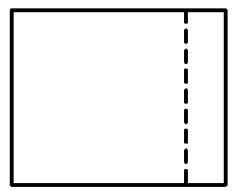 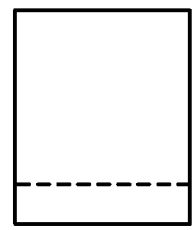

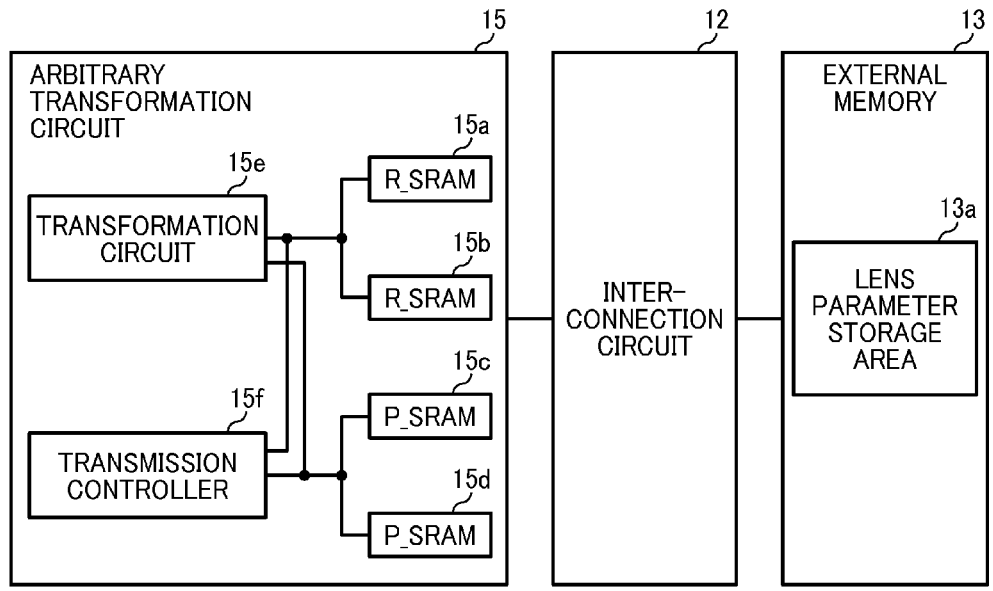
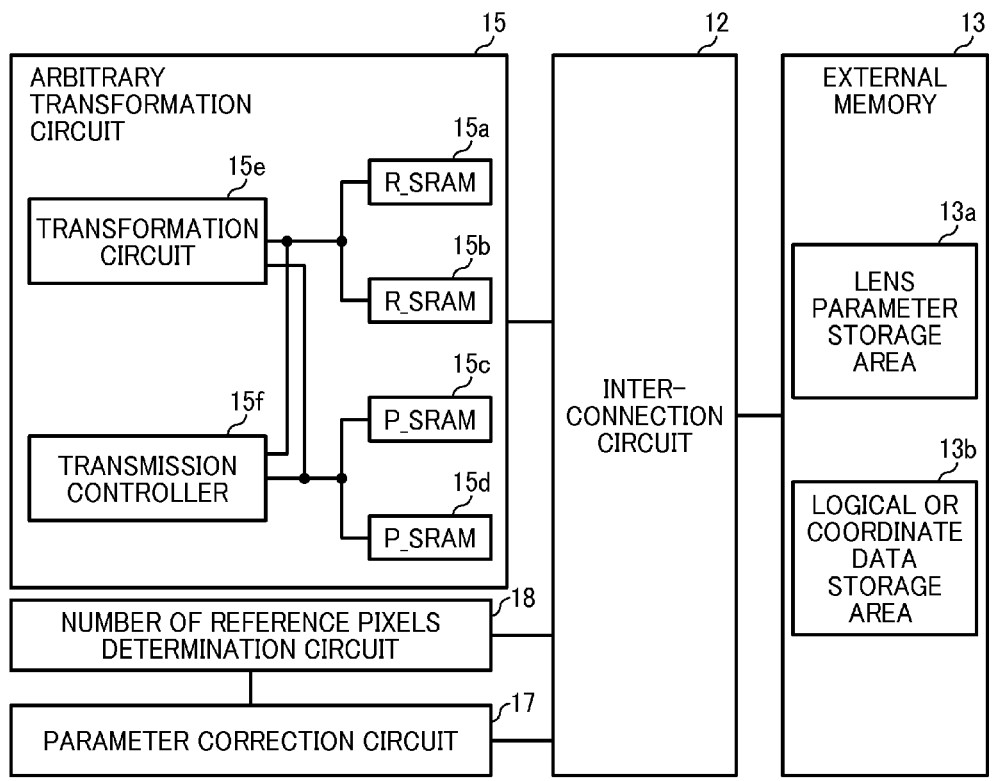

IMAGE PROCESSING APPARATUS, ELECTRONIC APPARATUS, AND IMAGE PROCESSING METHOD

CROSS-REFERENCE TO RELATED APPLICATIONS

This patent application is based on and claims priority pursuant to 35 U.S.C. §119(a) to Japanese Patent Application No. 2014-241312, filed on Nov. 28, 2014 in the Japan Patent Office, the entire disclosures of which are hereby incorporated by reference herein.

BACKGROUND

Technical Field

The present invention relates to an image processing apparatus, an electronic apparatus, and an image processing method.

Background Art

In many cases, image data captured by image capture devices such as digital cameras is distorted due to lens aberration etc. Especially, image data captured by using a wide-range lens and a fish-eye lens is further distorted. To correct the distorted image data, for example, image processing apparatuses that includes an arbitrary transformation circuit using affine transformation etc. is known.

SUMMARY

Embodiments of the present invention provide a novel image processing apparatus that includes a transformation circuit that performs a predetermined transformation process based on a reference area referred from an input image stored in a first memory corresponding to each divided area that divides an output image to be generated into multiple areas and a second memory that stores a transmission area including a logical OR area of the multiple reference areas. The transformation circuit transfers the transmission area from the first memory to the second memory and performs the predetermined transformation process based on the reference area included in the transmission area transferred to the second memory.

Further embodiments of the present invention provide an electronic apparatus and an image processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating a case that reference areas overlap as an embodiment of the present invention.

FIG. 6 is an enlarged diagram illustrating the overlapping area in FIG. 5.

FIGS. 7A, 7B, and 7C are diagrams illustrating transmission areas as an embodiment of the present invention.

FIG. 10 is a block diagram illustrating a configuration of a substantial part of an information processing apparatus that includes an image processing apparatus as another embodiment of the present invention.

FIG. 11 is a block diagram illustrating a configuration of a substantial part of an information processing apparatus that includes an image processing apparatus as yet another embodiment of the present invention.

DETAILED DESCRIPTION

Figure 1:
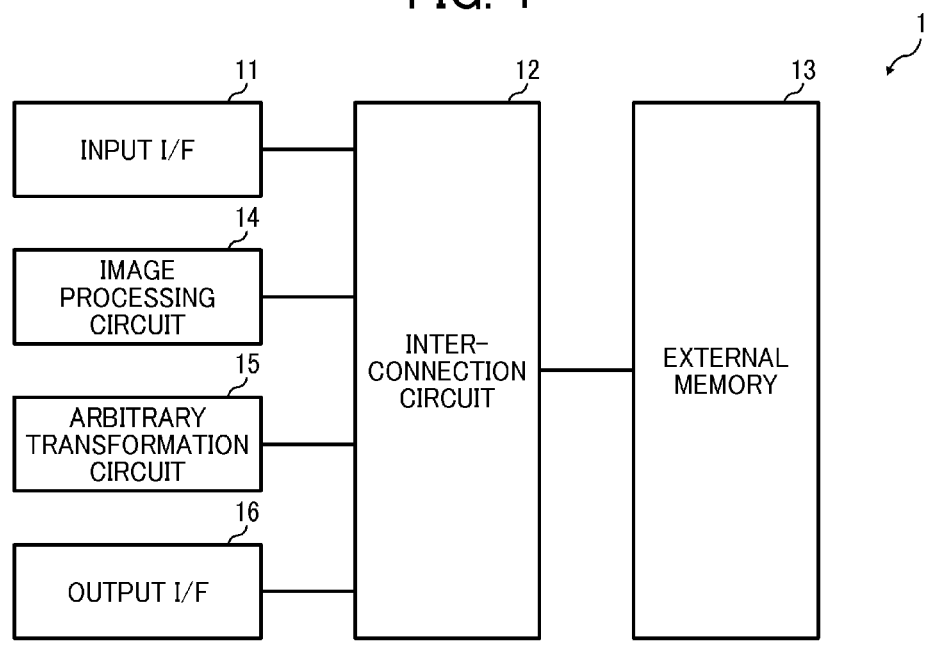
FIG. 1 is a block diagram illustrating a configuration of an information processing apparatus that includes an image processing apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the known image processing apparatuses, it is known to divide an output image into multiple areas, acquire a reference area for each divided area, and process the divided areas based on the reference areas. In this case, an area referred when Nth (N is a predetermined integer) divided area is processed overlaps with an area referred when (N−1)th or (N−X)th (X is equal to or larger than 1 and less than N) divided area is processed in some cases. In that case, same data is transferred repeatedly, degrading data transfer efficiency and increasing bus bandwidth of a memory that stores the image data.

For example, a technology that stores an overlapping part among adjacent rectangle areas in a cache memory is known. In the known technology, in reading the target rectangular area from a main memory, data of a part that overlaps with the adjacent rectangular area is not read from the main memory but read from the cache memory, and areas that do not overlap is read from the main memory.

However, in an image processing apparatus in the known technology, while the overlapping area is read from the cache memory, other areas are read from the main memory. As a result, the main memory is accessed each time the rectangular area is processed. As disclosed in the known technology, since various blocks such as a drawing circuit and multiple image processing apparatuses access the main memory, transfer efficiency of the memory and processing efficiency deteriorate in case of conflicting accesses.

In the embodiments described below, an image processing apparatus that can improve the transfer efficiency of a memory for example is provided.

First Embodiment

An image processing apparatus in the first embodiment is described below with reference to FIGS. 1 to 9. FIG. 1 is a block diagram illustrating a configuration of an information processing apparatus 1 that includes an image processing apparatus in this embodiment. As shown in FIG. 1, the information processing apparatus 1 includes an input interface (I/F) 11, an interconnection circuit, an external memory 13, an image processing circuit 14, an arbitrary transformation circuit 15, and an output I/F 16.

Image data (input image data) is input into the input I/F 11 from outside.

The interconnection circuit 12 accesses the external memory 13 in accordance with accesses to the external memory 13 from the input I/F 11, the image processing circuit 14, and the arbitrary transformation circuit 15 to read/write image data from/to the external memory 13. In addition, the interconnection circuit 12 arbitrates between accesses to the external memory 13 from the input I/F 11, the image processing circuit 14, and the arbitrary transformation circuit 15. In addition, the interconnection circuit 12 outputs processed image data output by the image processing circuit 14 and the arbitrary transformation circuit 15 to the output I/F 16.

For example, the external memory 13 as a first memory consists of a Synchronous Dynamic Random Access Memory (SDRAM) etc., and input image data input from the input I/F 11 is written in via the interconnection circuit 12. In addition, from the external memory 13, the input image data that the image processing circuit 14 and the arbitrary transformation circuit 15 needs for processing is transferred via the interconnection circuit 12.

Figure 2:
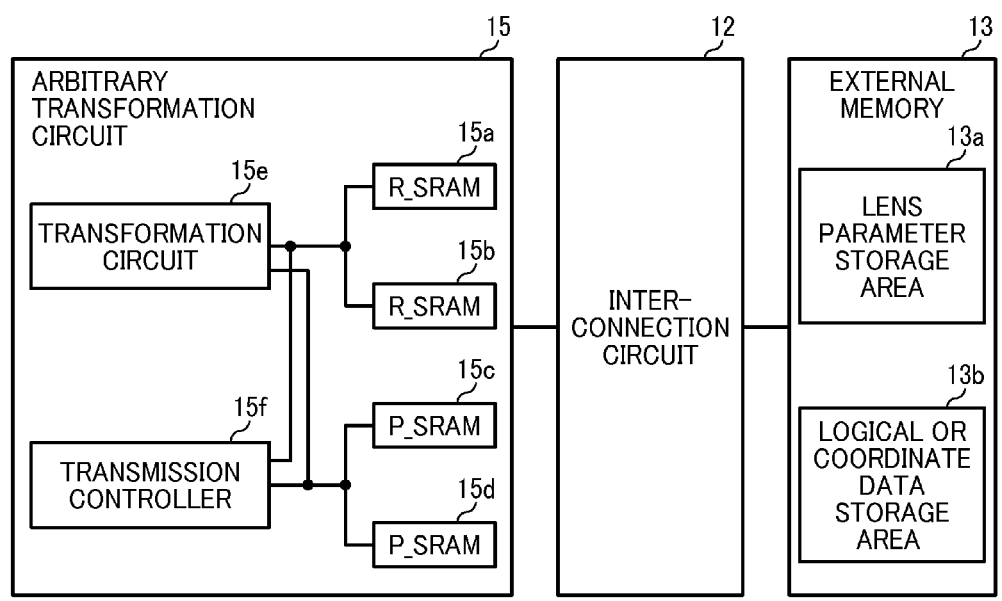
FIG. 2 is a block diagram illustrating a substantial part in FIG. 1.

In addition, as shown in FIG. 2, the external memory 13 includes a lens parameter storage area 13a and a logical OR coordinate data storage area 13b. In the lens parameter storage area 13a, for example, lens parameters such as focal length, an f number (iris), a projection eye position, and distortion etc. are stored. For example, these lens parameters are used for processing by the image processing circuit 14 and the arbitrary transformation circuit 15. In addition, the lens parameters are load from outside via the input I/F 11 and the interconnection circuit 12 preliminarily on start-up for example.

In the logical OR coordinate data storage area 13b, coordinate data of areas including OR of multiple reference areas (described later) (transmission area coordinates) are stored. Just like the lens parameters, the coordinate data of areas including OR of the multiple reference areas are load from outside via the input I/F 11 and the interconnection circuit 12 preliminarily on start-up for example.

The image processing circuit 14 performs image processing such as a filter processing on the input image data stored in the external memory 13 and the imaged data after the arbitrary transformation circuit 15 processes.

The arbitrary transformation circuit 15 as the image processing apparatus in this embodiment performs the transformation process such as distortion correction and rotation etc. on the input image data stored in the external memory 13. That is, the arbitrary transformation circuit 15 functions as a transformation circuit.

As shown in FIG. 2, the arbitrary transformation circuit 15 includes a R_SRAM 15a, R_SRAM 15b, P_SRAM 15c, a P_SRAM 15d, a transformation circuit 15e, and a transmission controller 15f. The reference areas transferred from the external memory 13 via the interconnection circuit 12 are stored in the R_SRAM 15a and the R_SRAM 15b. The lens parameters transferred from the lens parameter storage area 13a in the external memory 13 via the interconnection circuit 12 are stored in the P_SRAM 15c and the P_SRAM 15d. The R_SRAM 15a, the R_SRAM 15b, the P_SRAM 15c, and the P_SRAM 15d consist of a Static Random Access Memory (SRAM).

In addition, the R_SRAM 15a and the R_SRAM 15b are the same storage size, and the P_SRAM 15a and the P_SRAM 15b are the same storage size.

In addition, the R_SRAM 15a and the R_SRAM 15b are used alternately. That is, they are toggled. For example, if the reference area is transferred to the R_SRAM 15a from the external memory 13 firstly, the second transmission is performed on the R_SRAM 15b.

In addition, the P_SRAM 15a and the P_SRAM 15b are used alternately. That is, they are toggled. For example, if the lens parameters of the reference area S (S is an integer equal to or larger than 0) is transferred to the P_SRAM 15a, the lens parameters of the reference area S+1 is transferred to the P_SRAM 15b. That is, the lens parameters are configured for each reference area.

The transformation circuit 15e performs transformation processes such as distortion correction and rotation etc. for example based on the reference areas and the lens parameters stored in the R_SRAM 15a, the R_SRAM 15b, the P_SRAM 15c, and the P_SRAM 15d.

The transmission controller 15f controls transmission of the image data and the lens parameters to the R_SRAM 15a, the R_SRAM 15b, the P_SRAM 15c, and the P_SRAM 15d.

The output I/F 16 outputs the image data processed by the image processing circuit 14 and the arbitrary transformation circuit 15 to external devices.

The information processing apparatus 1 in this embodiment can include the input I/F 11, the interconnection circuit 12, the image processing circuit 14, the arbitrary transformation circuit 15, and the output I/F 16 other than the external memory 13 in a semiconductor integrated circuit. In addition, the information processing apparatus 1 can consist of printed circuit boards and modules that include multiple semiconductor integrated circuits.

Otherwise, it is also possible to implement the configuration in FIG. 1 by a computer program executed by a Central Processing Unit (CPU) using a memory. For example, the CPU can function as the input I/F 11, the interconnection circuit 12, the image processing circuit 14, the arbitrary transformation circuit 15, and the output I/F 16, and the memory can function as the external memory 13.

Furthermore, it is possible to implement the arbitrary transformation circuit 15 only as a computer program (an image processing program). In this case, the CPU functions as the transformation circuit and the transmission controller, and the memory functions as the R_SRAM 15a, the R_SRAM 15b, the P_SRAM 15c, and the P_SRAM 15d.

Figure 3:
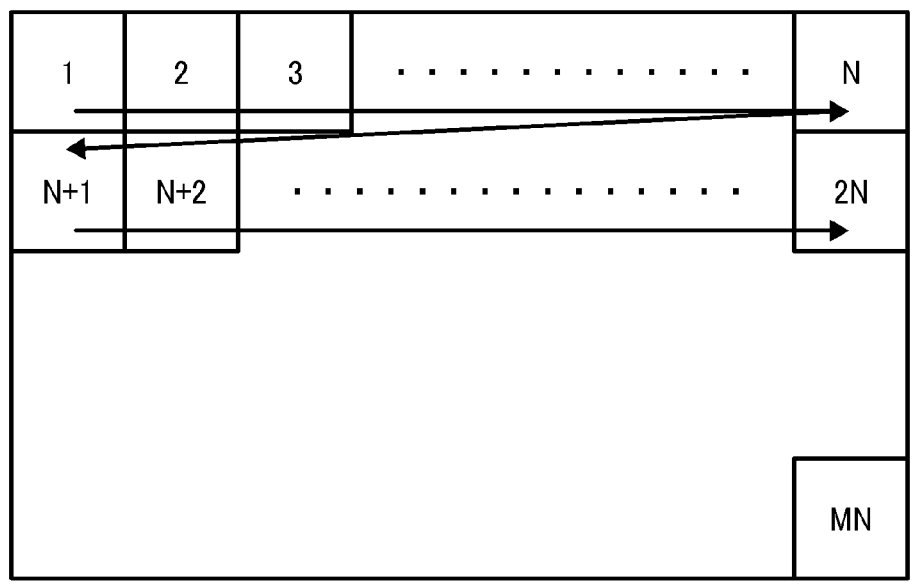
FIG. 3 is a diagram illustrating an output image as an embodiment of the present invention.

Next, an operation of the arbitrary transformation circuit 15 described above is shown below. FIG. 3 is a diagram illustrating an output image that the arbitrary transformation circuit 15 outputs in this embodiment. As shown in FIG. 3, the output image is divided into multiple areas (divided areas). As shown in FIG. 3, the output image is divided into N (N is an integer equal to or larger than 1) areas in the main scanning direction (in the landscape direction in FIG. 3), and the output image is divided into M (M is an integer equal to or larger than 1) areas in the sub-scanning direction (in the portrait direction in FIG. 3).

Figure 4:
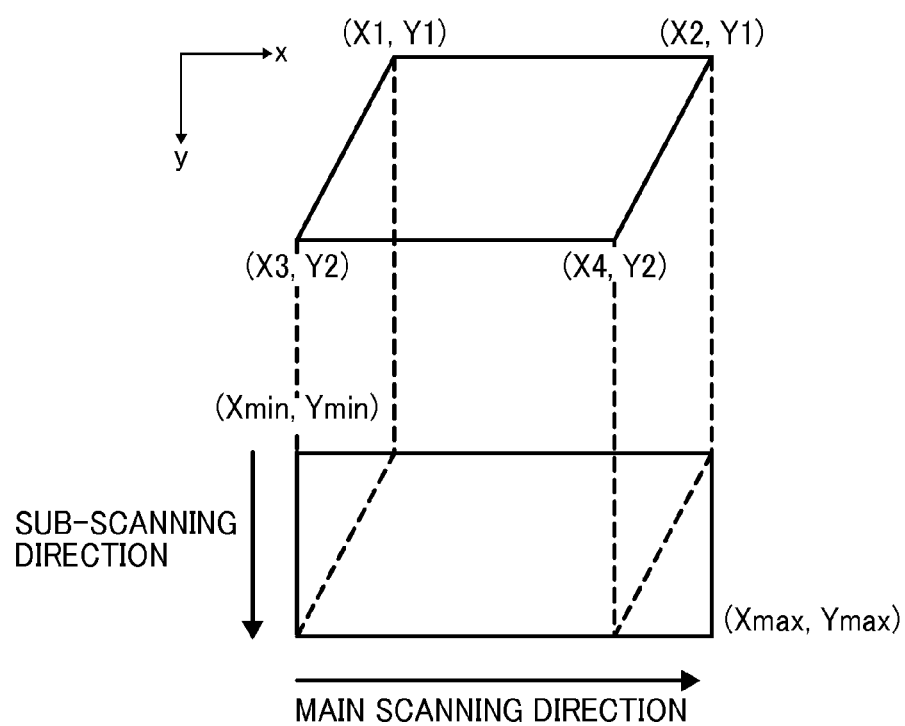
FIG. 4 is a diagram illustrating a reference area as an embodiment of the present invention.

Each of the divided areas (the image data included in the divided area) of the output image in FIG. 3 is generated with reference to a predetermined area of the input image. Areas that are referred in generating the divided areas are called reference areas. FIG. 4 is a diagram illustrating the reference area in this embodiment. The upper part of FIG. 4 illustrates the reference area. In FIG. 4, the reference area is parallelogram-shaped. However, the reference area can take other shape depending on the transformation process and positions of the divided areas.

For example, X-axis in the upper part of FIG. 4 indicates the main scanning direction, and Y-axis in the upper part of FIG. 4 indicates the sub-scanning direction. In FIG. 4, coordinates of four vertex of the parallelogram are (X1, Y1), (X2, Y1), (X3, Y2), and (X4, Y2). These coordinates can be calculated from the lens parameters store in the lens parameter storage area 13a.

Among four coordinates shown in the upper part in FIG. 4, after calculating coordinates $(X_{min}, Y_{min})$ that include the minimum value in the X-axis direction and the minimum value in the Y-axis direction and $(X_{max}, Y_{max})$ that include the maximum value in the X-axis direction and the maximum value in the Y-axis direction, a rectangular area in the lower part in FIG. 4 is derived. The rectangular area in the lower part in FIG. 4 is a circumscribed quadrangle of the parallelogram in the upper part in FIG. 4. In this embodiment, rectangular areas and squire areas calculated based on two coordinates $(X_{min}, Y_{min})$ and $(X_{max}, Y_{max})$ located on the diagonal are read from the external memory 13 and transferred. In FIG. 4, $(X_{min}, Y_{min})$ and $(X_{max}, Y_{max})$ are calculated as (X3, Y1) and (X2, Y2).

That is, assuming the X-axis direction as one coordinate axis and the Y-axis direction as another coordinate axis orthogonal to the X-axis, the coordinate $(X_{min}, Y_{min})$ consists of the minimum value on one coordinate axis and the minimum value on the other coordinate axis. Similarly, the coordinate $(X_{max}, Y_{max})$ consists of the maximum value on one coordinate axis and the maximum value on the other coordinate axis.

In some cases, the reference areas overlap in case of the adjacent divided areas. For example, as shown in FIG. 5, a part of the reference area of the divided area 1 overlaps with a part of the reference area of the divided area 2.

FIG. 6 is an enlarged diagram illustrating the reference areas that overlap. Part A in FIG. 6 corresponds to the overlapping part in FIG. 5. In this case, in case of transferring from the external memory each time the divided area is referred, the same data is transferred multiple times, degrading the transfer efficiency of the external memory 13.

Therefore, in this embodiment, circumscribed quadrangle-shaped area including logical OR areas of multiple reference areas is transferred to the R_SRAM 15a or the R_SRAM 15b from the external memory 13 at once. The circumscribed quadrangle-shaped area including the logical OR areas of multiple reference areas is referred to as a "transmission area" hereinafter. That is, the transmission area corresponds to the transferred area. In the embodiments, if it is described that areas such as the reference areas and the transmission areas are transferred, that means image data included in the transferred area is transferred.

FIGS. 7A, 7B, and 7C are diagrams illustrating transmission areas in this embodiment. The upper part of FIGS. 7A, 7B, and 7C illustrates the reference areas only, and the lower part of FIGS. 7A, 7B, and 7C illustrates the transmission areas corresponding to the upper part. FIG. 7A is a diagram illustrating a case that a part of the reference area 1 overlaps with a part of the reference area 2. FIGS. 7B and 7C are diagrams illustrating cases that all part of the reference area 1 overlaps with a part of the reference area 2.

The arbitrary transformation circuit 15 in FIG. 1 transfers the transmission area whose data size is equal to or smaller than the storage size of the R_SRAM 15a or the R_SRAM 15b at once. It is possible to calculate the number of the reference areas included in the transmission area transferred at once preliminarily. That is, it is possible that the transmission area includes not only two reference areas but also more than three reference areas.

The lens parameters are configured preliminarily, and the lens parameters are known in accordance with the lens to be used. In addition, coordinates of each of the reference areas can be calculated from the lens parameters. As a result, two coordinates $(X_{min}, Y_{min})$ and $(X_{max}, Y_{max})$ derived after operating OR of the multiple reference areas can also be calculated. Two coordinates $(X_{min}, Y_{min})$ and $(X_{max}, Y_{max})$ are referred to as "transmission area coordinates" hereinafter. In case of calculating the transmission area coordinates from multiple reference areas, it is possible to calculate the transmission area coordinates by comparing the coordinate data of the multiple reference areas. That is, the transmission area coordinates correspond to the coordinate data indicating the transmission area.

In addition, after calculating the transmission area coordinates, it is possible to calculate data size of the transmission area. Since the storage size of the R_SRAM 15a and the R_SRAM 15b are known, it is possible to calculate the number of the reference areas that can be included in the transmission area whose size corresponds to the upper limit of the storage size of the R_SRAM 15a and the R_SRAM 15b preliminarily. That is, the transmission area is determined to include multiple reference areas within the range of the storage size of the second memory.

In this embodiment, an arbitrary value is selected from the number of the reference areas within the range of the storage size of the R_SRAM 15a or the R_SRAM 15b calculated from the known value. Subsequently, based on the selected value, the transmission area coordinates are calculated preliminarily, and the calculated transmission area coordinates are stored in the logical OR coordinate data storage area 13b preliminarily. After that, the arbitrary transformation circuit 15 acquires the transmission area coordinates from the logical OR coordinate data storage area 13b and transfers the transmission area indicated by the transmission area coordinates to the R_SRAM 15a or the R_SRAM 15b from the external memory 13. That is, the arbitrary transformation circuit 15 functions as the coordinate data acquisition circuit, and the R_SRAM 15a and the R_SRAM 15b function as the second memory.

Since the transmission area coordinates are different depending on positions of the corresponding divided areas, multiple combinations per one image (one frame) are stored in the logical OR coordinate data storage area 13b.

Figure 8:
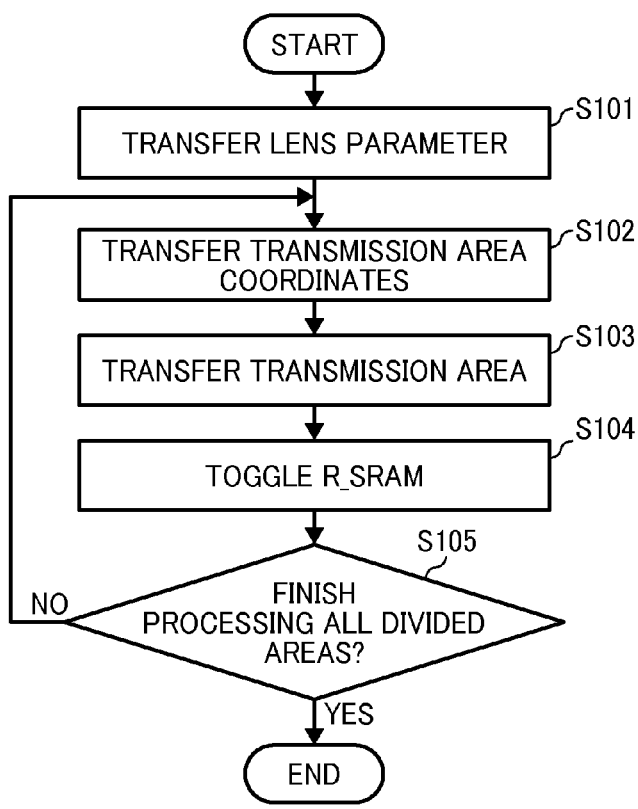
FIG. 8 is a flowchart illustrating a process performed by a transmission controller in FIG. 2.
Figure 9:
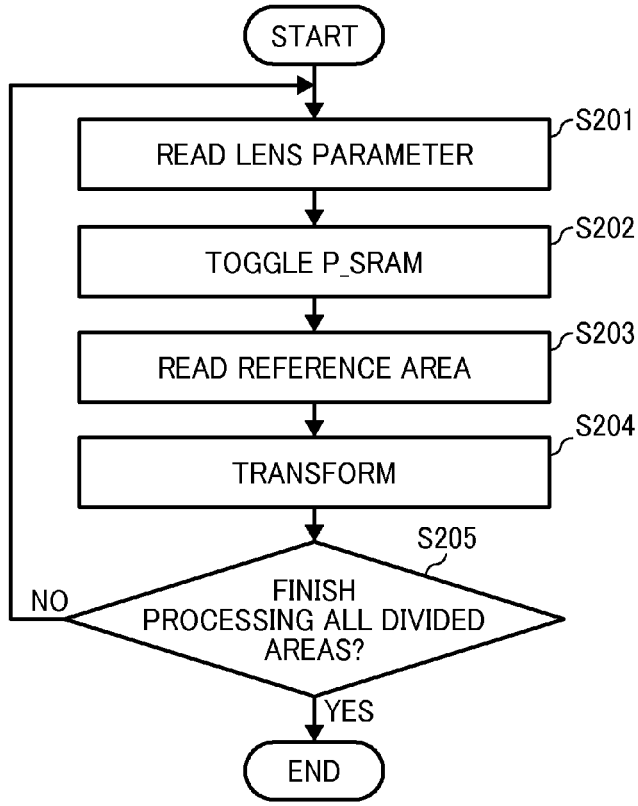
FIG. 9 is a flowchart illustrating a process performed by a transformation circuit in FIG. 2.

An image processing method in this embodiment is described below with reference to flowcharts in FIGS. 8 and 9. FIG. 8 is a flowchart illustrating a process performed by the transmission controller 15f.

First, in S101, the lens parameters are transferred to the P_SRAM 15c and P_SRAM 15d from the external memory 13. All of the lens parameters are transferred at once. For example, if numbers are assigned to the divided areas as shown in FIG. 3, the lens parameters for the odd divided area numbers are transferred to the P_SRAM 15c, and the lens parameters for the even divided area numbers are transferred to the P_SRAM 15d.

Next, in S102, the transmission area coordinates are transferred to internal registers in the transmission controller 15f for example from the external memory 13. That is, the arbitrary transformation circuit 15 reads the transmission areas based on the acquired coordinate data.

Next, in S103, the transmission area based on the transmission coordinates transferred in S102 is transferred from the external memory 13. Either the transmission controller 15f or the interconnection circuit 12 can generate addresses of the transmission area in the external memory 13 based on the transmission area coordinates.

Next, in S104, the R_SRAM to which the transmission area is transferred is toggled. For example, if the transmission area is transferred to the R_SRAM 15a in S103, the next transmission destination is changed into the R_SRAM 15b in S104. Subsequently, in case of performing the step in S103 next time, the transmission area is transferred to the changed (toggled) R_SRAM.

Next, in S105, it is determined whether or not it is finished processing all of the divided areas. If it is finished (YES in S105), the process for one frame is finished. If it is not finished (NO in S105), the process returns to S101. To determine whether or not it is finished processing all of the divided areas, for example, it is possible to configure the number of transmission areas per frame preliminarily and determine whether or not it is finished transferring all of the transmission area coordinates in S102. Otherwise, it is possible to configure the numbers of reference areas and divided areas included in the transmission area preliminarily and calculate the number of transmission areas based on them.

The lens parameters transferred in the flowchart in FIG. 8 and the input image data included in the reference area included in the transmission area are used for the transformation process by the transformation circuit 15e subsequently. A process of the transformation circuit 15e is described below with reference to a flowchart in FIG. 9.

First, in S201, the lens parameters of the reference area corresponding to the divided area to be processed are read from the P_SRAM 15c or the P_SRAM 15d. For example, it is possible to assign numbers to the divided areas as shown in FIG. 3, and it is possible to indicate the divided area to be processed by updating the divided area number sequentially.

Next, in S202, the R_SRAM from which the lens parameters are read is toggled. For example, if the lens parameters are read from the P_SRAM 15c in S201, the next source is changed into the P_SRAM 15d in S202. Subsequently, in case of performing the step in S201 next time, the lens parameters are read from the changed (toggled) P_SRAM.

Next, in S203, the reference area is read from the R_SRAM. The reference area is read from the R_SRAM that finished transferring the transmission area in S103 in FIG. 8.

Next, in S204, a transformation process is performed based on the read reference area. After finishing the transformation process, the arbitrary transformation circuit 15 outputs the divided area to outside via the interconnection circuit 12 and the output I/F 16. That is, a predetermined transformation process is performed based on the reference area included in the transmission area.

Next, in S205, it is determined whether or not it is finished processing all of the divided areas. If it is finished (YES in S205), the process for one frame is finished. If it is not finished (NO in S205), the process returns to S201. To determine whether or not it is finished processing all of the divided areas, for example, it is possible to determine whether or not it is finished reading lens parameters corresponding to all of the divided area numbers in S201.

It should be noted that the transmission controller 15f in FIG. 8 and the transformation circuit 15e operate concurrently. For example, after the transmission controller 15f transfers the transmission area to the R_SRAM 15a, the transmission controller 15f transfers the subsequent transmission area to the R_SRAM 15b, and the transformation circuit 15e performs the transformation process with reference to the transmission area stored in the R_SRAM 15a simultaneously. As described in this embodiment, it is possible to perform the process described above by including two planes of R_SRAM. In addition, it is possible to derive a result that the step S103 in FIG. 8 and the steps S203 and S204 in FIG. 9 correspond to the transformation process from the above description clearly.

In this embodiment, the transformation circuit 15e in the arbitrary transformation circuit 15 divides the output image into multiple areas and performs the predetermined transformation process based on the reference area referred in the input image for each divided area. In addition, the arbitrary transformation circuit 15 includes a transmission controller 15f that transfers a transmission area including the logical OR area of multiple reference areas from the external memory 13 to the R_SRAM 15a or the R_SRAM 15b. As a result, since it is possible to transfer multiple reference areas from the external memory 13 to the R_SRAM 15a or the R_SRAM 15b at once, it is possible to enhance transfer efficiency regarding the external memory 13.

In addition, the transmission area is determined based on the transmission area coordinates and transferred. Consequently, it is possible to calculate the transmission area preliminarily from existing data. Therefore, it is unnecessary that the arbitrary transformation circuit 15 calculates the transmission area etc., preventing from increasing scale of circuits and content of processes, enhancing efficiency of processes.

In addition, the transmission areas are determined based on the storage size of the R_SRAM 15a or the R_SRAM 15b and the number of reference areas included in the transmission area. As a result, it is possible to include the reference area as many as the R_SRAM 15a and the R_SRAM 15b can store in the transmission area. Therefore, it is possible to transfer the reference areas as many as possible at once, enhancing the transfer efficiency of the external memory 13, ensuring the bus bandwidth.

In addition, since the logical OR coordinate data storage area 13b in the external memory 13 stores the transmission area coordinates, it is possible to reduce the size of the memory etc. in the arbitrary transformation circuit 15. As a result, it is possible to prevent the scale of circuits from increasing. Furthermore, by using the external memory 13, since it is possible to ensure a margin of changing the size of the logical OR coordinate data storage area 13b, it is possible to support various image sizes.

In this embodiment, while the precalculated transmission area coordinates are stored in the logical OR coordinate data storage area 13b in the external memory 13, it is possible to store them in an internal memory (such as a memory and a register) in the arbitrary transformation circuit 15.

In addition, in this embodiment, while the transformation process is performed on the input image data input from the input interface 11, it is possible to perform the transformation process on the image data after being processed by the image processing circuit 14. In this case, the transmission area is not the input image data but the image data after being processed by the image processing circuit 14. That is, in the claimed invention, the input image indicates the image input to the image processing apparatus.

Second Embodiment

Next, an image processing apparatus in the second embodiment is described below with reference to FIG. 10. It should be noted that the same symbols are assigned to the parts same as the first embodiment, and their descriptions are omitted.

In this embodiment, as shown in FIG. 10, the logical OR coordinate data storage area 13b is omitted. In this embodiment, the lens parameter storage area 13a stores the coordinate data of the reference area along with the lens parameters.

In the arbitrary transformation circuit 15, the transmission controller 15f calculates the transmission area coordinates based on the coordinate data of the reference areas stored in the P_SRAM 15c and the P_SRAM 15d. The number of the reference areas included in the transmission area, i.e., the number of performing OR operation, is selected arbitrarily below the upper limit of the storage size of the R_SRAM 15a or the R_SRAM 15b (described in the first embodiment) and configured in the arbitrary transformation circuit 15 preliminarily. The transmission controller 15f performs OR operation of the reference area based on the configured value to calculate the transmission area coordinates.

Just like the first embodiment, the calculated transmission area coordinates are used for transferring the transmission area from the external memory 13.

In this embodiment, since the arbitrary transformation circuit 15 calculates the transmission area coordinates, it is unnecessary to include the logical OR coordinate data storage area 13b in the external memory 13, making it easy to manage data in the external memory 13.

In addition, in this embodiment, while the lens parameter storage area 13a stores the coordinate data of the reference areas, it is possible to calculate the coordinate data of the reference areas directly from the lens parameters by the transmission controller 15f.

Third Embodiment

An image processing apparatus in the first embodiment is described below with reference to FIGS. 1 to 9. It should be noted that the same symbols are assigned to the parts same as the first embodiment, and their descriptions are omitted. As shown in FIG. 11, in the image processing apparatus in this embodiment, a parameter correction circuit 17 and a number of reference pixels determination circuit 18 are added to the configuration in FIG. 2. In addition, the lens parameter storage area 13a stores the coordinate data of the reference area along with the lens parameters.

The parameter correction circuit 17 as a correction circuit corrects the coordinate data of the reference area stored in the logical OR coordinate data storage area 13b at predetermined intervals. An example of the predetermined intervals is that the correction is performed for each frame. For example, if a shape of the lens is changed due to some external causes such as heat, it is possible that the reference area is modified in some cases. In that case, it is possible that the parameter correction circuit 17 cannot perform the accurate transformation process using the transmission area coordinates stored in the logical OR coordinate data storage area 13b preliminarily. To cope with this issue, for example, the coordinate data etc. of the reference area is corrected based on a predetermined interpolation process etc. An example of the above process is described below with reference to FIGS. 12 and 13.

Figure 12:
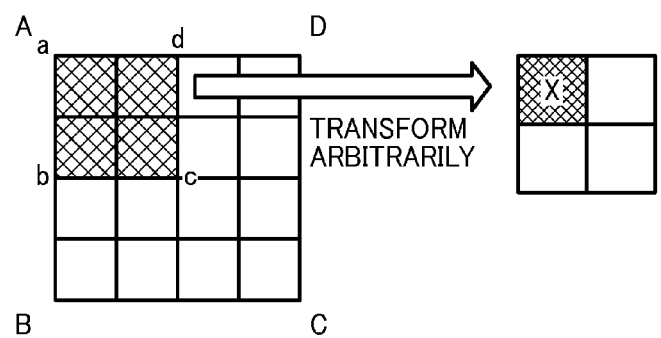
FIG. 12 is a diagram illustrating a normal transformation process without correction.

FIG. 12 is a diagram illustrating a normal transformation process without correction (arbitrary transformation). As shown in FIG. 12, the arbitrary transformation circuit 15 refers to the reference area with vertices A, B, C, and D in generating the divided areas with two-by-two pixels, and four-by-four pixels are included in the area. In addition, four pixels in the area with coordinates a, b, c, and d included in the area with vertices A, B, C, and D are referred in generating one pixel X in the divided area with two-by-two pixels.

Figure 13:
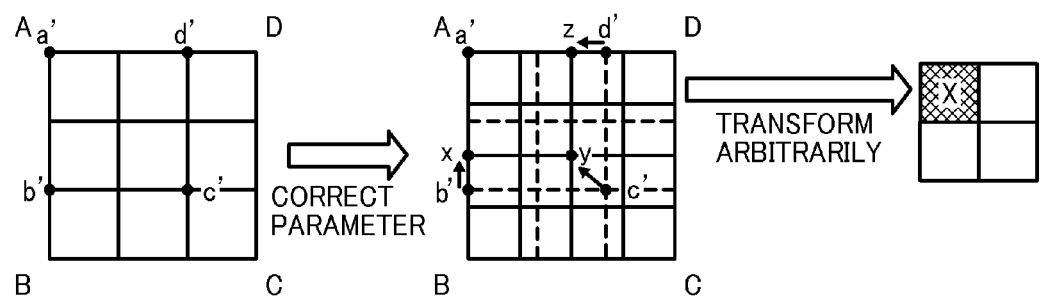
FIG. 13 is a diagram illustrating a transformation process with correction.

In this case, in case of applying some external causes such as heat, it is possible that the pixels in the reference area with vertices A, B, C, and D referred in generating the divided area with two-by-two pixels in FIG. 12 change into three-by-three pixels as shown in FIG. 13.

In this case, while four pixels in the area with coordinates a', b', c', and d' are referred in generating one pixel X in the divided area with two-by-two pixels, it is impossible to generate an accurate pixel X using these pixels.

To cope with this issue, the three-by-three pixels within the coordinates A, B, C, and D are converted into four-by-four pixels. In that case, new coordinates x, y, and z are generated from b', c', and d'. The pixel X can be generated based on pixels included in those coordinates x, y, z, and a' (which is equal to a). The parameter correction circuit 17 generates coordinate positions corresponding to x, y, and z described above. For example, the correction process described above is performed by inputting a control signal etc. into the information processing apparatus 1 when the external cause is detected by a sensor etc.

The number of reference pixels determination circuit 18 as a transmission area calculation circuit calculates the transmission area based on the coordinate data of the reference area corrected by the parameter correction circuit 17 and stores it in the logical OR coordinate data storage area 13b. The number of reference pixels determination circuit 18 calculates data amount in the transmission area by operating OR of the reference areas corrected by the parameter correction circuit 17. Subsequently, the transmission area coordinates of the transmission area that includes the maximum number of reference areas within the range of the storage size of the R_SRAM 15a or the R_SRAM 15b in the logical OR coordinate data storage area 13b. That is, the number of reference pixels determination circuit 18 calculates the coordinate data indicating the transmission area by operating OR of the multiple reference areas based on the coordinate data of the reference area corrected by the correction circuit.

A specific example is described below. The transmission area is calculated by operating OR between the corrected reference area corresponding to the top divided area and the corrected reference area corresponding to the second divided area. (The calculated transmission area is referred to as "a transmission area 1+2" hereinafter.) Subsequently, it is determined whether or not data amount of the transmission area 1+2 exceeds the storage size of the R_SRAM 15a or the R_SRAM 15b. After the determination, if it is determined that the data amount of the transmission area 1+2 does not exceed the storage size of the R_SRAM 15a or the R_SRAM 15b, logical OR between the corrected reference area corresponding to the subsequent third divided area and the transmission area 1+2 to calculate a new transmission area. (The calculated transmission area is referred to as "a transmission area 1+2+3" hereinafter. That is, logical OR between the result of logical OR and the subsequent reference area is operated.

Subsequently, it is determined whether or not data amount of the transmission area 1+2+3 exceeds the storage size of the R_SRAM 15a or the R_SRAM 15b. After the determination, if it is determined that the data amount of the transmission area 1+2+3 exceeds the storage size of the R_SRAM 15a or the R_SRAM 15b, the transmission area coordinates of the previous transmission area 1+2 are stored in the logical OR coordinate data storage area 13b in the external memory 13.

After the determination, if it is determined that the data amount of the transmission area 1+2 does not exceed the storage size of the R_SRAM 15a or the R_SRAM 15b, logical OR between the corrected reference area corresponding to the subsequent fourth divided area and the transmission area 1+2+3 to calculate a new transmission area. After that, the determination same as described above is performed.

Figure 14:
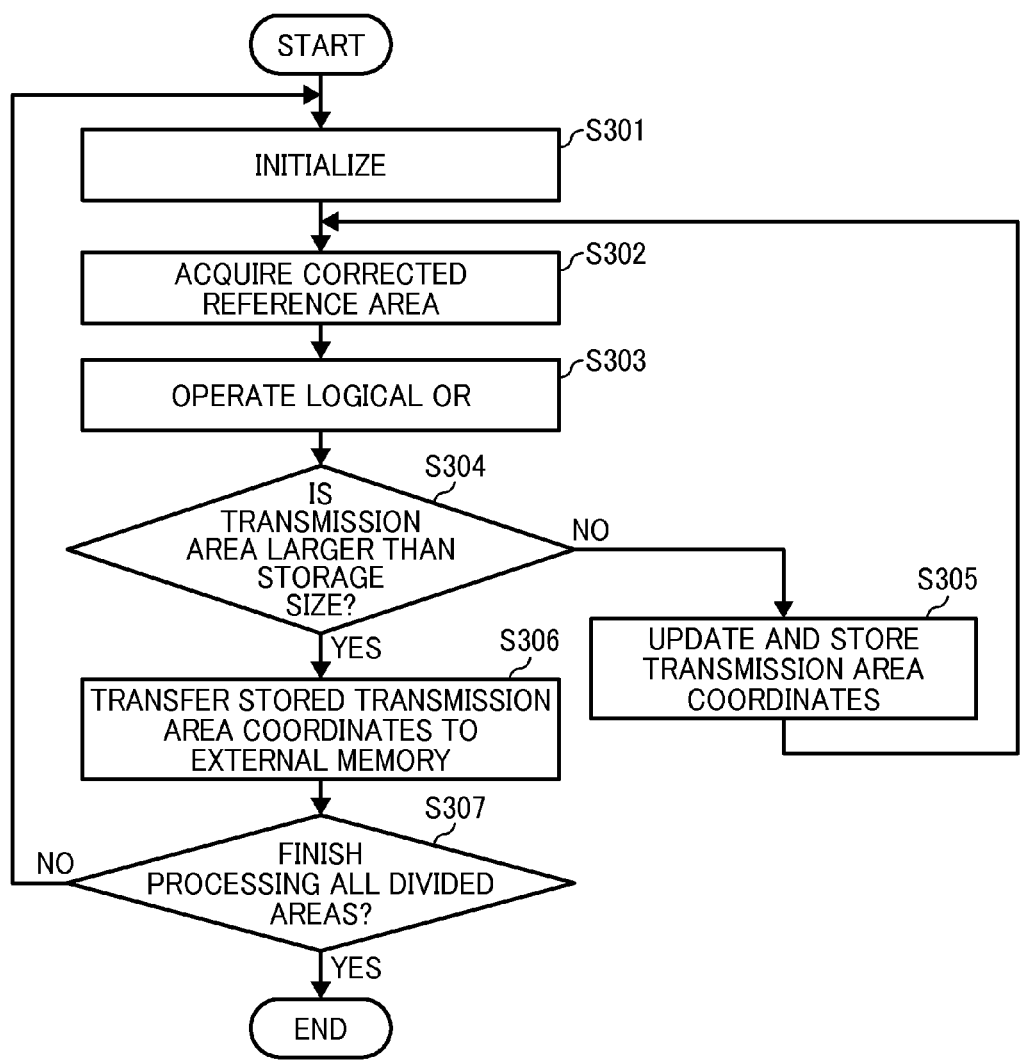
FIG. 14 is a flowchart illustrating a process performed by a number of reference pixels determination circuit in FIG. 11.

An operation of the number of reference pixels determination circuit 18 (an image processing method in this embodiment) is described below with reference to flowchart in FIG. 14. First, initialization is performed in S301. In the initialization, internal registers that stores a transmission area (described later) in the number of reference pixels determination circuit 18 etc. are reset.

Next, in S302, the coordinate data of the corrected reference area is acquired from the parameter correction circuit 17.

Next, in S303, the transmission area is calculated by operating logical OR between the reference area acquired in S302 and the transmission area stored in the internal registers etc. If the step S303 is executed for the first time, since the internal registers etc. that store the transmission area are initialized, the transmission area becomes the reference area acquired in S302.

Next, in S304, it is determined whether or not the data amount of the transmission area calculated in S303 exceeds the storage size of the R_SRAM 15a or the R_SRAM 15b. If the data amount of the transmission area calculated in S303 does not exceed the storage size (NO in S304), the process proceeds to S305. In S305, the transmission area coordinates of the transmission area calculated in S303 are stored in the memory such as the internal registers, and the process returns to S302 to acquire the coordinate data of the subsequent corrected reference area.

By contrast, if it is determined that the data amount of the transmission area exceeds the storage size of the R_SRAM 15a or the R_SRAM 15b (YES in S304), the process proceeds to S306. In S306, the transmission area coordinates stored in the internal registers etc. in S305 is transferred to the logical OR coordinate data storage area 13b in the external memory 13 via the interconnection circuit 12.

That is, the transmission area coordinates calculated by the number of reference pixels determination circuit 18 consist of coordinates including the maximum value on one coordinate axis and the maximum value on the other coordinate axis perpendicular to the one coordinate axis and coordinates including the minimum value on one coordinate axis and the minimum value on the other coordinate axis. In addition, the data amount of the transmission area coordinates does not exceed the storage size of the second memory.

Next, in S307, it is determined whether or not it is finished processing all of the divided areas. If it is finished (YES in S307), the process for one frame is finished. If it is not finished (NO in S307), the process returns to S301. To determine whether or not it is finished processing all of the divided areas, for example, it is possible to determine whether or not it is finished acquiring reference areas corresponding to all of the divided area numbers in S302. The process returns to S301 in case of NO in S307 since it is desired to initialize the internal registers to calculate the transmission area coordinates of the subsequent transmission area.

The transmission area coordinates calculated in the flowchart described above are stored in the logical OR coordinate data storage area 13b. Subsequently, the arbitrary transformation circuit 15 transfers the transmission area coordinates to itself just like the operation in the first embodiment and transfers the reference area from the external memory 13 to the R_SRAM 15a or the R_SRAM 15b based on the transferred transmission area coordinates. After that, the transformation circuit 15e reads the reference area from the R_SRAM 15a and the R_SRAM 15b and performs the transformation process.

As described above, the image processing apparatus in this embodiment consists of the parameter correction circuit 17 and the number of reference pixels determination circuit 18 along with the arbitrary transformation circuit 15.

In this embodiment, the parameter correction circuit 17 that corrects the coordinates of the reference area and the number of reference pixels determination circuit 18 that calculates the transmission area coordinates by operating logical OR of the multiple reference areas are included. In addition, the number of reference pixels determination circuit 18 stores the calculated transmission area coordinates in the logical OR coordinate data storage area 13b, and the arbitrary transformation circuit 15 reads the transmission area coordinates from the logical OR coordinate data storage area 13b to transfer the transmission area. As a result, it is possible to make corrections if the reference areas are modified due to external causes such as heat.

In addition, the number of reference pixels determination circuit 18 selects the coordinates ($X_{max}$, $Y_{max}$) and ($X_{min}$, $Y_{min}$) as the transmission area coordinates among acquired coordinates after operating logical OR of the multiple reference areas. As a result, it is possible to make a rectangular area that circumscribes the reference area and is determined by two coordinates located on the diagonal as the reference area. If the reference area is rectangular, it is easy to generate addresses accessing the external memory 13, enhancing access efficiency of the external memory 13.

In addition, the number of reference pixels determination circuit 18 stores the transmission area coordinates acquired by operating logical OR in the internal registers etc. If the data amount of the transmission area exceeds the storage area of the R_SRAM 15a or the R_SRAM 15b, the previously calculated transfer area coordinates stored in the internal register to the logical OR coordinate data storage area 13b. As a result, it is possible to include the largest reference area among the reference areas that the R_SRAM 15a and the R_SRAM 15b can store in the transmission area. Therefore, it is possible to transfer the reference areas as many as possible at once, enhancing the transfer efficiency of the external memory 13, ensuring the bus bandwidth.

In this embodiment, the reference area coordinates are stored in the lens parameter storage area 13a preliminarily. However, it is possible to calculate the coordinate data of each reference area based on the lens parameters stored in the lens parameter storage area 13a. In addition, it is possible store the transmission area coordinates and coordinate data of the reference areas etc. are stored not in the external memory 13 that stores the input image data but in another memory etc.

In addition, in the embodiments described above, the external memory 13 stores the lens parameters, and the example of the transformation process is to correct distortion due to aberration of lens etc. However, it is possible to perform other transformation processes. That is, a transformation process that includes not only the lens parameters but also parameters that can specify an area of referring to the input image in performing the transformation process.

Figure 15:
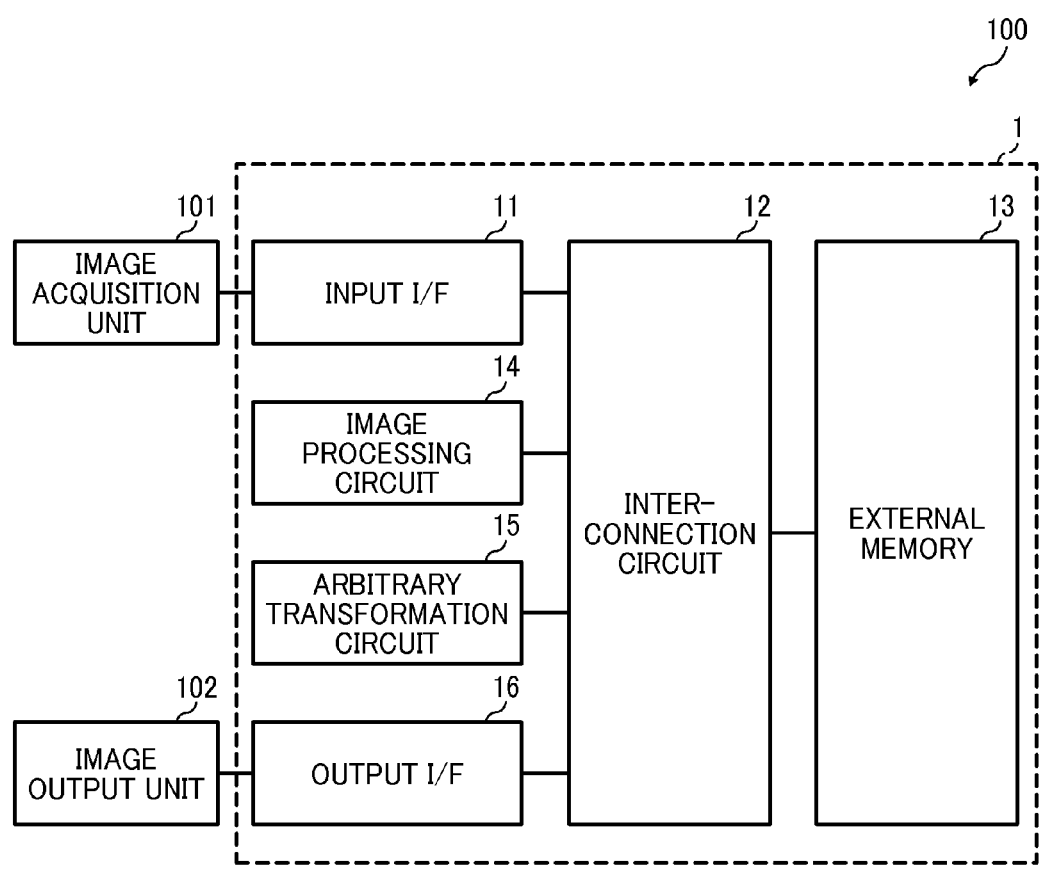
FIG. 15 is a block diagram illustrating a configuration of an electronic apparatus as an embodiment of the present invention.

An example of an electronic apparatus that includes any one of the information processing apparatuses 1 in the above embodiments is described below with reference to FIG. 15. FIG. 15 is a diagram illustrating the information processing apparatus 1 in FIG. 1 or FIG. 11.

In the electronic apparatus 100 in FIG. 15, an image acquisition unit 101 and an image output unit 102 are added to the information processing apparatus 1. For example, if the electronic apparatus 100 is a digital camera, an image capture device (image capture unit) or a converter to YUV422 format corresponds to the image acquisition unit 101, and a display unit such as a liquid crystal display etc. and a storage medium such as a memory card correspond to the image output unit 102.

In the electronic apparatus 100 in FIG. 15, the image acquisition unit 101 converts images captured by the image capture device into YUV422 format to input them into the information processing apparatus 1. In the information processing apparatus 1, as described in the above embodiments, the transmission area is transferred from the external memory 13 to the R_SRAM 15a etc. to perform the transformation process such as the distortion correction process etc., and the image output unit 102 displays the transformed images on the display unit.

It should be noted that the image acquisition unit 101 is not limited to the image capture device etc. For example, if images are stored in storage media such as a memory card or a hard disk drive etc., it is possible to use those storage media. If images are acquired via a network etc., it is possible to use a network interface etc.

Similarly, the image output unit 102 is not limited to the display unit. For example, if images are to be stored in storage media such as a memory card or a hard disk drive etc., it is possible to use those storage media. If images are output via a network etc., it is possible to use a network interface etc.

In addition, the electronic apparatus 100 is not limited to image capture apparatuses such as the digital camera etc. The electronic apparatus 100 can be a video apparatus, an information apparatus, a communication apparatus, or an image forming apparatus that includes transformation functions such as distortion correction and rotation of images.

The present invention also encompasses a non-transitory recording medium storing a program that executes an image processing method. The image processing method includes the steps of dividing an output image to be generated into multiple areas while referring to multiple reference areas in an input image stored in a first memory, each one of the multiple reference areas corresponding to each one of the multiple areas of the output image, transferring a transmission area including a logical OR area of the multiple reference areas from the first memory to a second memory, and performing a predetermined transformation process based on a reference area included in the transmission area transferred to the second memory.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An image processing apparatus, comprising:
   a transformation circuit to perform a transformation process based on a reference area referred from an input image stored in a first memory corresponding to each divided area that divides an output image to be generated into multiple areas; and
   a second memory to store a transmission area including a logical OR area of the multiple reference areas, wherein the transmission area is within a range of a storage size of the second memory such that the multiple reference areas are included in the transmission area,
   the transformation circuit being further configured to transfer the transmission area from the first memory to the second memory and perform the transformation process based on the reference area included in the transmission area transferred to the second memory.

2. The image processing apparatus according to claim 1, the transformation circuit being further configured to acquire coordinate data indicating the transmission area, and read the transmission area based on the acquired coordinate data.

3. The image processing apparatus according to claim 2, the transformation circuit being further configured to acquire coordinate data indicating the reference area and calculate the coordinate data indicating the transmission area based on the coordinate data indicating the reference area.

4. The image processing apparatus according to claim 3, the transformation circuit being further configured to acquire a parameter that specifies the reference area and calculate the coordinate data indicating the reference area based on the parameter.

5. The image processing apparatus according to claim 2, further comprising:
   a correction circuit being configured to acquire and correct coordinate data of the reference area; and
   a transmission area calculation circuit being configured to calculate the coordinate data indicating the transmission area by operating logical OR of the multiple reference areas based on the coordinate data of the reference area corrected by the correction circuit,
   the transformation circuit being further configured to acquire the coordinate data indicating the transmission area calculated by the transmission area calculation circuit.

6. The image processing apparatus according to claim 1, wherein the coordinate data indicating the transmission area is based on coordinates including a maximum value on a first coordinate axis and a maximum value on a second coordinate axis perpendicular to the first coordinate axis and coordinates including a minimum value on the first coordinate axis and a minimum value on the second coordinate axis among coordinate data indicating the multiple reference areas.

7. An electronic apparatus, comprising the image processing apparatus according to claim 1.

8. An electronic apparatus, comprising:
a first memory to store an input image;
the image processing apparatus of claim 1 to perform the transformation process based on the input image stored in the first memory; and
an image output circuit to output an image processed by the image processing apparatus.

9. A method of processing an image, comprising:
dividing an output image to be generated into multiple areas while referring to multiple reference areas in an input image stored in a first memory, each one of the multiple reference areas corresponding to each one of the multiple areas of the output image;
transferring a transmission area including a logical OR area of the multiple reference areas from the first memory to a second memory, wherein the transmission area is within a range of a storage size of the second memory such that the multiple reference areas are included in the transmission area; and
performing a transformation process based on a reference area included in the transmission area transferred to the second memory.

10. An image processing apparatus, comprising:
a transformation circuit to perform a transformation process based on multiple reference areas referred from an input image stored in a first memory corresponding to each divided area that divides an output image to be generated into multiple areas;
a correction circuit being configured to acquire and correct coordinate data of the multiple reference areas;
a transmission area calculation circuit being configured to calculate coordinate data indicating a transmission area by operating a logical OR of the multiple reference areas based on the coordinate data of the multiple reference areas corrected by the correction circuit; and
a second memory to store the transmission area including a logical OR area of the multiple reference areas,
the transformation circuit being further configured to
transfer the transmission area from the first memory to the second memory and perform the transformation process based on the multiple reference areas included in the transmission area transferred to the second memory, and
acquire the coordinate data indicating the transmission area and read the transmission area based on the acquired coordinate data.

11. The image processing apparatus according to claim 10, the transformation circuit being further configured to:
acquire a parameter that specifies a reference area and calculate the coordinate data indicating the reference area based on the parameter; and
acquire the coordinate data indicating the reference area and calculate the coordinate data indicating the transmission area based on the coordinate data indicating the reference area.

12. The image processing apparatus according to claim 11, wherein the coordinate data indicating the transmission area is based on coordinates including a maximum value on a first coordinate axis and a maximum value on a second coordinate axis perpendicular to the first coordinate axis and coordinates including a minimum value on the first coordinate axis and a minimum value on the second coordinate axis among coordinate data indicating the multiple reference areas.

13. The image processing apparatus according to claim 10, wherein the transmission area is within a range of a storage size of the second memory such that the multiple reference areas are included in the transmission area.

* * * * *